United States Patent [19]
Aoki

[11] Patent Number: 5,270,682
[45] Date of Patent: Dec. 14, 1993

[54] DISPLAY DEVICES OF THE REFLECTION TYPE FOR VEHICLE

[75] Inventor: Kunimitsu Aoki, Susono, Japan

[73] Assignee: Yazaki Corporation, Tokyo, Japan

[21] Appl. No.: 620,245

[22] Filed: Nov. 30, 1990

[30] Foreign Application Priority Data

Dec. 13, 1989 [JP] Japan .................................. 1-321495
Dec. 13, 1989 [JP] Japan .................................. 1-321497

[51] Int. Cl.$^5$ .................................................. B60Q 1/00
[52] U.S. Cl. .................................... 340/438; 340/461;
  359/833; 345/33
[58] Field of Search .................. 340/705, 438, 461;
  359/630, 631, 633, 636, 629, 833, 837; 116/286,
  298, 305, DIG. 36; 362/23, 28, 29; 353/14

[56] References Cited

U.S. PATENT DOCUMENTS

| | | | |
|---|---|---|---|
| 3,848,974 | 11/1974 | Hosking et al. | 340/705 |
| 3,867,623 | 2/1975 | Widlund | 116/DIG. 36 |
| 3,890,777 | 6/1975 | Stanish | 362/29 X |
| 4,431,966 | 2/1984 | Pacciarello | 116/286 |
| 4,697,879 | 10/1987 | Gerbe | 340/705 X |
| 4,729,634 | 3/1988 | Raber | 359/630 X |
| 4,878,453 | 11/1989 | Inoue et al. | 116/DIG. 36 |
| 4,973,942 | 11/1990 | Iino | 340/461 X |
| 4,986,631 | 1/1991 | Aoki et al. | 359/833 X |

Primary Examiner—John K. Peng
Assistant Examiner—Christine K. Oda
Attorney, Agent, or Firm—Armstrong, Westerman, Hattori, McLeland & Naughton

[57] ABSTRACT

A display device of the reflection type for a vehicle wherein an analog meter can be used to effect analog display and which, while remote indication is effected making use of a reflecting face of a reflecting element, is compact in overall size and has a long distance for the remote indication. The display device comprises a display unit, a reflecting member having a spherical reflecting face directed to a display face of the display unit, and a light transmitting reflecting element disposed between the display unit and the reflecting member and having a reflecting face through which display light from the display unit is transmitted. The reflecting member is disposed such that the center of the spherical shape of the reflecting face thereof optically coincides substantially with a preset visual point position on the driver's seat side while an optical axis of incident light to the reflecting member is coaxial or paraxial with an optical axis of emergent light from the reflecting member and reflected light from the reflecting member is directed to the driver's seat side of the vehicle by the reflecting face of the reflecting element.

9 Claims, 7 Drawing Sheets

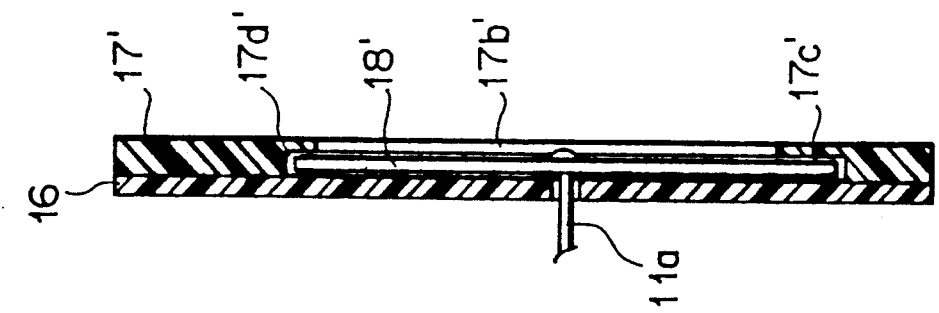
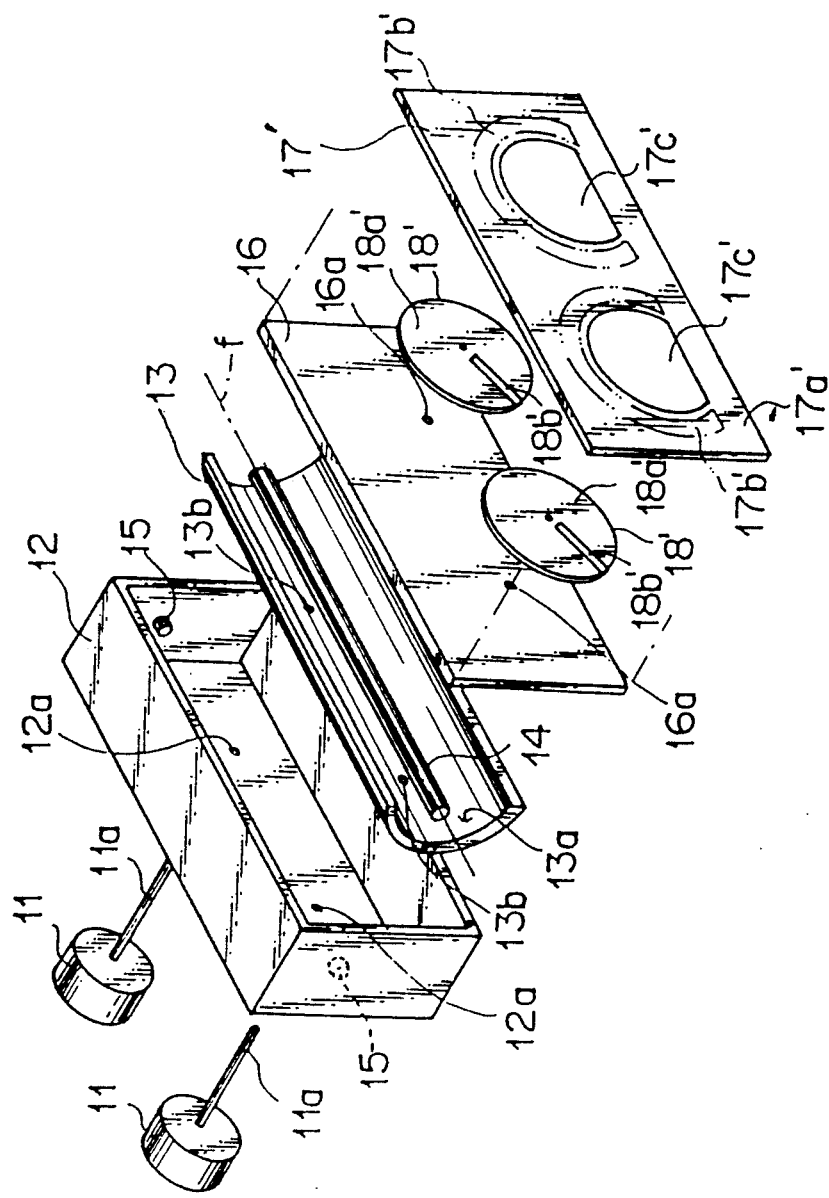

DISPLAY DEVICES OF THE REFLECTION TYPE FOR VEHICLE

BACKGROUND OF THE INVENTION

1. Field of the Invention

This invention relates to a display device of the reflection type for a vehicle wherein a display image on a display unit is reflected toward a driver's seat of the vehicle by a reflecting face of a reflecting element provided on an instrument panel of the vehicle to provide driving information to a driver.

2. Description of the Prior Art

Display devices for a vehicle are conventionally known wherein a reflecting face of a reflecting element is utilized to effect remote indication in order to assure high speed visual observation of a displayed image. An exemplary one of such display devices is shown in FIG. 14.

Referring to FIG. 14, the conventional display device shown includes a display unit 23 such as a liquid crystal display unit or a fluorescent character display tube mounted on a lower face of a meter hood 22 of an instrument panel 21 of a vehicle. A half mirror 24 is disposed on a meter display section of the instrument panel 21. A display image of the display unit 23 is projected onto the half mirror 24 so that a virtual image 25 of the display image of the display unit 23 may be visually observed by way of the half mirror 24.

The virtual image 25 visually observed in this manner is formed at an interior position spaced by a distance equal to the distance between the half mirror 24 and the display unit 23 rearwardly of the half mirror 24, thereby obtaining an effect of remote indication.

However, the effect of remote indication cannot be obtained sufficiently with such a display device a the device shown in FIG. 14 wherein light is reflected only once by a half mirror.

Referring now to FIG. 15, there is shown another exemplary one of such conventional display devices as described above. The display device shown includes a reflecting plate 36 disposed in an opposing relationship to a half mirror 34 in a meter hood 32 of an instrument panel 31 of a vehicle. A display device 33 is disposed in an opposing relationship to the reflecting plate 36 in the meter hood 32. A display image of the display unit 33 is projected to the half mirror 34 by way of the reflecting plate 36 so that a virtual image 35 displayed on the display unit 33 may be visually observed by way of the half mirror 34 and the reflecting plate 36.

With the display device of FIG. 15, a path of light of a long distance is assured from the display unit 33 to the mirror 34, and a higher effect of remote indication than that, for example, of the device of FIG. 14 can be achieved.

However, where light is reflected by two or more times in order to assure a long path of light as in the display device of FIG. 15, a comparatively great volume is required for such path of light, which requires a comparatively great overall size of the display device.

It is to be noted that reference numeral 27 in FIG. 14 and reference numeral 37 in FIG. 15 denote each another display unit which can be visually observed in an overlapping relationship with the virtual image 25 or 35 displayed by the display device.

By the way, with a display device which makes use of a reflecting face of a reflecting element so that a virtual image displayed on a display unit may be visually observed as described above, due to a relationship of an amount of light reflected from the reflecting face, only a display pattern of the display unit from which light is emitted can be visually observed such that, for example, a light emitting segment itself of a fluorescent character display tube can be visually observed while any other portion of the fluorescent character display tube than the light emitting segment cannot be visually observed. Accordingly, in a display device of the type described, there is an advantage, in addition to an effect of remote indication, that a large amount of light can be obtained with the display unit and accordingly a high contrast in display can be assured. Further, a display image can be seen clearly on the dark background, and generally the quality of a display image is higher than that of a display unit of the direct vision type.

It is to be noted that such advantages described just above are derived from the fact that a display pattern emits light, and in order to allow a displayed image to be visually observed for practical use, a self light emitting display unit is employed in such a display device of the reflection type as described above.

Generally, a digital display unit is employed popularly as a display unit of the self light emitting type, and also such a display device of the reflection type as described above normally employs a digital display unit. However, a digital display unit is normally expensive comparing with an analog meter, and consequently, a high cost is required for a display device in which a digital display unit is employed. Further, drivers of automobiles are progressively inclined to have a taste of an analog meter, and development of a display device of the reflection type which employs an analog meter is demanded.

It is to be noted that analog meters of the light emitting type which are directed to display at night are also known, and an exemplary one of such analog meters of the light emitting type is shown in FIG. 13. Referring to FIG. 13, the analog meter shown includes a meter mechanism 41, a dial 42, and a light introducing plate 43 interposed between the meter mechanism 41 and the dial 42. Thus, light from a pair of light source bulbs 44 is introduced into the light introducing plate 43 by way of the opposite ends 43a so as to cause the light introducing plate 43 to emit light behind the dial 42 so that light transmitting graduations and so forth formed on the dial 42 may look such that they emit light therefrom.

However, since a sufficient amount of light cannot be obtained with an analog meter wherein light is directly irradiated upon a back face of a dial using a light introducing plate in this manner, it cannot be employed in a display device of the reflection type.

SUMMARY OF THE INVENTION

It is an object of the present invention to provide a display device of the reflection type for a vehicle wherein an analog meter can be used to effect analog display.

It is another object of the present invention to provide a display device of the reflection type for a vehicle which, while remote indication is effected making use of a reflecting face of a reflecting element, is compact in overall size and has a long distance for the remote indication.

In order to attain the objects, according to one aspect of the present invention, there is provided a display device of the reflection type for a vehicle, which comprises a display unit having a display face, a reflecting member having a spherical reflecting face directed to the display face of the display unit, and a light transmitting and reflecting element disposed between the display unit and the reflecting member. The light transmitting and reflecting element has a reflecting face through which display light from the display unit is transmitted. The reflecting member is disposed such that the center of the spherical shape of the reflecting face thereof optically coincides or substantially coincides with a preset position as a visual point position on the driver's seat side. An optical axis of light which is transmitted through the reflecting element and introduced to the reflecting face of the reflecting member is coaxial or paraxial with an optical axis of the light after it is reflected by the reflecting face of the reflecting member. The light reflected from the reflecting face of the reflecting member is directed to a driver's seat side of the vehicle by the reflecting face of the reflecting element.

With the display device of the reflection type for a vehicle, display light from the display unit is transmitted through the reflecting element, and such transmitted light is reflected by the reflecting member and then by the reflecting element so that it is visually observed by a driver of the vehicle.

In this instance, since the optical axis of the incident light to the reflecting member is coaxial or paraxial with the optical axis of emergent light from the reflecting member, a path of light along which incident light advances from the reflecting element to the reflecting member and another path of light along which reflected light advances from the reflecting member to the reflecting element occupy a substantially same spacing. Consequently, the entire display device can be made compact while assuring a long distance for remote indication.

Further, those of rays of light introduced from the driver's seat side to the reflecting member by way of the reflecting face of the reflecting element which are subsequently reflected by the reflecting member and then by the reflecting face of the reflecting element and directed back toward the visual point position are limited only to those rays of light which pass a location around the visual point position toward the reflecting element. Accordingly, even if external light of a headlamp of a succeeding vehicle or from the sun upon sunset or the like is admitted into the display device from the opposite sides of the driver, the driver will not be dazzled by such external light at all.

According to another aspect of the present invention, there is provided a display device of the reflection type for a vehicle, which comprises a light emitting analog meter, and a light reflecting element provided on an instrument panel of the vehicle and having a reflecting face for reflecting display light from the light emitting analog meter toward a driver's seat of the vehicle. The light emitting analog meter includes a dial indicator for emitting light therefrom when backlight is received, a dial having graduations which emit light therefrom when backlight is received, a light diffusing plate disposed behind the pointer and the dial, and a reflector having a concave reflecting face directed toward the light diffusing plate. A discharge lamp serves as a light source and is disposed at or near a focus of the reflector between the light diffusing plate and the reflector. A meter mechanism is disposed behind the reflector and has a pointer shaft which extends through the reflector and the light diffusing plate and is connected to the pointer. The light emitting analog meter is constituted such that light from the discharge lamp is reflected by the reflector and then transmitted through the light diffusing plate so that backlight may be irradiated upon rear faces of the dial and the dial indicator.

With the display device of the reflection type for a vehicle, the dial indicator of the light emitting analog meter is turned by the meter mechanism by way of the pointer shaft which extends through the reflector and the light diffusing plate. Meanwhile, light of the discharge lamp is first reflected by the reflector and then diffused by the light diffusing plate, and such diffused light is irradiated upon the rear faces of the dial indicator and the dial so that the dial indicator and the graduations may emit light therefrom to provide display light. Such display light is reflected toward the driver's seat side by the reflecting face of the reflecting element provided on the instrument panel of the vehicle, thereby effecting analog indication. Accordingly, light of a high intensity can be obtained from the light emitting analog meter. Consequently, with the display device of the reflection type for a vehicle, analog indication can be achieved using an analog meter.

According to a further aspect of the present invention, there is provided a display device of the reflection type for a vehicle, which comprises a light emitting analog meter including a dial indicator for emitting light therefrom when backlight is received and a dial having graduations which emit light therefrom when backlight is received. A reflecting member is provided which has a reflecting face directed toward the dial indicator and the dial of the light emitting analog meter. A light transmitting reflecting element is disposed between the light emitting analog meter and the reflecting member and has a reflecting face which transmits display light from the light emitting analog meter therethrough. The light emitting analog meter further includes a light diffusing plate disposed behind the pointer and the dial, a reflector having a concave reflecting face directed toward the light diffusing plate, a discharge lamp serving as a light source and disposed at or near a focus of the reflector between the light diffusing plate and the reflector, and a meter mechanism disposed behind the reflector. The meter mechanism has a rotatable shaft which extends through the reflector and the light diffusing plate and is connected to the dial indicator. The light emitting analog meter is constituted such that light from the discharge lamp is reflected by the reflector and then transmitted through the light diffusing plate so that backlight may be irradiated upon rear faces of the dial indicator and the dial. The reflecting member is disposed such that an optical axis of light which is transmitted through the reflecting element and introduced to the reflecting face of the reflecting member is coaxial or paraxial with an optical axis of light after it is reflected by the reflecting face of the reflecting member. Reflected light from the reflecting face of the reflecting member is directed to a driver's seat side of the vehicle by the reflecting face of the reflecting element.

Also with the display device of the reflection type for a vehicle, similar advantages to those described above can be attained.

The above and other objects, features and advantages of the present invention will become apparent from the following description and the appended claims, taken in conjunction with the accompanying drawings.

BRIEF DESCRIPTION OF THE DRAWINGS

FIG. 7 is a similar view but showing a modified analog meter of the light emitting type which includes a modified dial and a modified pointer plate to those of the analog meter of FIG. 4;

FIG. 8 is a sectional view of the analog meter of FIG. 7;

DESCRIPTION OF THE PREFERRED EMBODIMENTS

Figure 2:
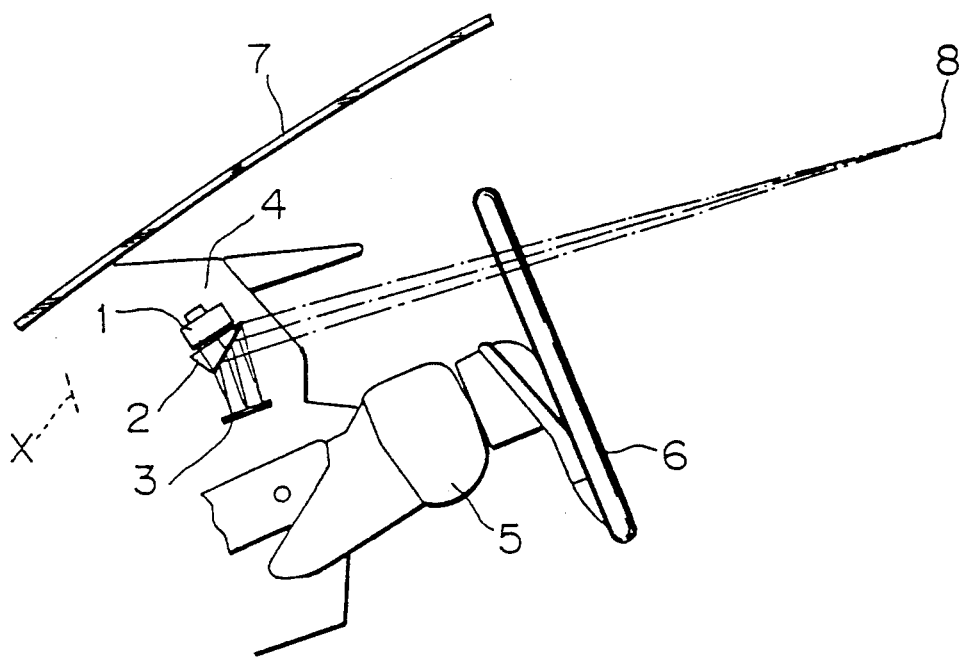
FIG. 2 is a schematic side elevational view showing the display device of FIG. 1 mounted in position in an instrument panel of a vehicle.

Referring first to FIG. 2, a display device of the reflection type for a vehicle to which the present invention is applied is shown mounted on a vehicle. The display device includes an analog meter of the light emitting type which includes a backlight device not shown which will be hereinafter described. The display device further includes a prism 2 serving as a reflecting element, and a spherical mirror or reflecting member 3 of the totally reflecting type having a slightly curved concave reflecting face. The display device is accommodated in an instrument panel 4 of the vehicle which includes a steering column 5, a steering wheel 6 and a windshield 7.

As hereinafter described in detail, display light of the light emitting analog meter 1 first passes through the prism 2 and is then reflected by the spherical mirror 3 and further by a reflecting face of the prism 2 so that, when viewed from a position at or near a visual point 8 of a driver, a virtual image X is visually observed at a position behind the prism 2, that is, forwardly of the vehicle.

Figure 1:
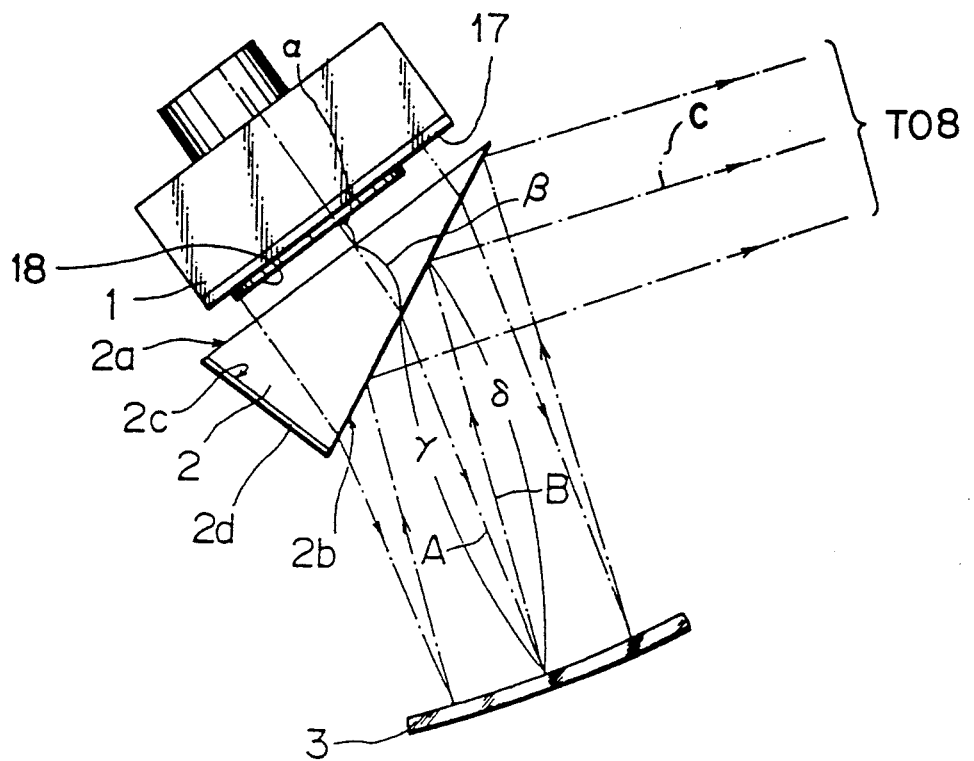
FIG. 1 is a schematic side elevational view of a display device of the reflection type for a vehicle showing a preferred embodiment of the present invention.

Referring now to FIG. 1, the display device is shown more in detail. The prism 2 is disposed in the proximity of a dial 17 of the light emitting analog meter 1, and the spherical mirror 3 is disposed in a spaced relationship from the prism 2 and in an opposing relationship to the dial 17 of the light emitting analog meter 1.

Each of alternate long and short dash lines in FIG. 1 represents a representative one of rays of light which advance from the light emitting analog meter 1 finally to the visual point 8. As can be seen from such alternate long and short dash lines, display light emitted from the light emitting analog meter 1 is introduced at the right angle to a first face 2a of the prism 2 on the incidence side, but when it subsequently passes through a second face 2b of the prism 2 which serves also as a reflecting face as described below, it is refracted by the second face 2b as represented by a ray of light on an optical axis A so that it is subsequently introduced substantially at the right angle to the spherical mirror 3.

The, such incidence light is reflected as represented by a ray of light on an optical axis B making a small angle with respect to the optical axis A satisfying a reflecting condition at the spherical mirror 3, and the reflected light is directed toward the second face 2b of the prism 2. The reflected light is further reflected by the second surface 2b of the prism 2 so that it is directed in parallel to an optical axis C toward the visual point 8. Here, the optical axes A and B may be coaxial or paraxial with each other, but since they are proximate to each other, rays of light are reciprocated between the second face 2b of the prism 2 and the spherical mirror 3.

Accordingly, the length of an optical path when rays of light are reciprocated is substantially equal to twice the distance between the second face 2b of the prism 2 and the spherical mirror 3, and while the optical path is long, the spacing occupied by the optical path is small. Consequently, the entire device can be made compact.

A virtual image which is visually observed from the visual point 8 then is positioned within an angular range in which the second face 2b of the prism 2 is included, and the distance from the second face 2b to the virtual image is greater than a sum total of distances between the individual members which is given by $$\alpha + \beta + \gamma + \delta$$

where $\alpha$ is a distance between a surface of a pointer plate 18 on the dial 17 and the first face 2a of the prism 2. $\beta$ is a distance of an optical axis of the first face 2a of the prism 2 between the first and second faces 2a and 2b of the prism 2, $\gamma$ is a distance of the optical axis A from the second face 2b of the prism 2 to the spherical mirror 3, and $\delta$ is a distance of the optical axis B from the spherical mirror 3 to the second facr 2b of the prism 2.

Figure 10:
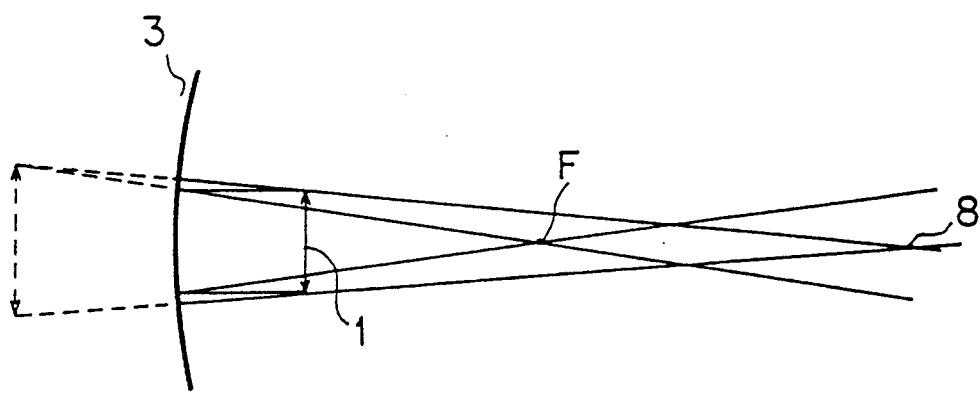
FIG. 10 is a diagrammatic view illustrating a relationship between the spherical mirror and the light emitting analog meter in the display device of FIG. 1.

In particular, since the spherical mirror 3 has a slightly curved concave reflecting face and the light emitting analog meter 1 is optically disposed on the inner side of a focus F of the spherical mirror 3, that is, between the focus F and the spherical mirror 3 as shown in FIG. 10, the virtual image X is visually observed in an enlarged size greater than a size of the image displayed by the light emitting analog meter 1 and at a position further interior to a position spaced by a distance equal to $\alpha + \beta + \gamma + \delta$ from the second face 2b of the prism 2 due to an action of the concave mirror 3.

Since a display image is enlarged by the spherical mirror 3 in this manner, the light emitting analog meter 1 may have a reduced size. Further, since the sphere of the spherical mirror 3 is set such that the center thereof may substantially coincide with the visual point 8, those of rays of light introduced from the visual point 8 side to the spherical mirror 3 by way of the second face 2b of the prism 2 which are reflected by the spherical mirror 3 and then by the second face 2b and directed back toward the visual point 8 are limited only to those rays of light which advance from the visual point position 8 toward the second face 2b. Actually, however, since the face of the driver is present at the visual point position 8, the driver will not see external light which may be introduced to the spherical mirror 3 by way of the second face 2b of the prism 2.

Accordingly, even if external light of a headlamp of a succeeding vehicle or from the sun upon sunset or the like comes into a rear portion of a room of the vehicle, the driver will not be dazzled by such external light at all.

Meanwhile, the optical positional relationship of the diaplay device to the visual point 8 can be set readily by, for example, adjusting the angle of the spherical mirror 3 in a condition wherein the light emitting analog meter 1 and the prism 2 are fixed to the instrument panel 4.

Subsequently, description will be given of a relationship between the visual point 8 (direction of the optical axis C) and the prism 2 and also of characteristics of the prism 2.

Figure 3:
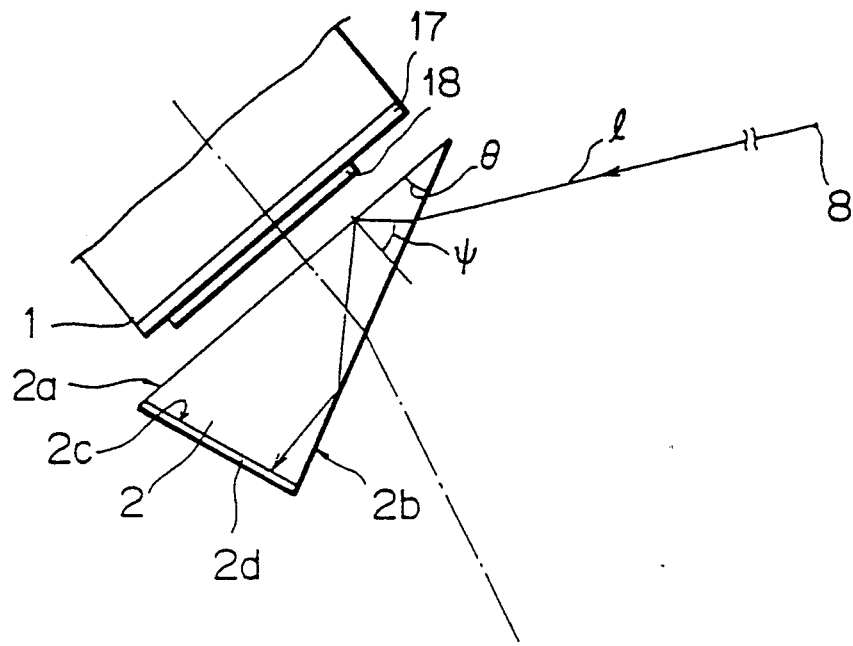
FIG. 3 is a diagrammatic view illustrating operation of a prism of the display device of FIG. 1.

Referring to FIG. 3, there is shown an imaginary ray of light 1 which is introduced form the visual point 8 side into the prism 2. The locus of such imaginary ray of light 1 can be geometrically optically considered as a line of sight from the visual point position 8.

The angle $\theta$ between the first and second faces 2a and 2b of the prism 2 is set as such an angle with which a ray of light 1 is introduced into the prism 2 by way of the second face 2b of the prism 2 at which it is refracted and then such incidence ray of light 1 is totally reflected by the first face 2a in the prism 2. In particular, the angle $\psi$ between the incidence ray of light 1 to the first face 2a of the prism 2 and a normal line to the first face 2a is set greater than a critical angle of incdcence for total reflection at the first face 2a of the prism 2. It is to be noted that, when light is totally reflected by the first face 2a of the prism 2 as described just above, it will subsequently be totally reflected also by the second face 2b of the prism 2 as seen in FIG. 3.

Accordingly, when the second face 2b of the prism 2 is viewed in the direction of such ray of beam 1, that is, in the direction from the visual point position 8, and outside of the first face 2a, that is, the light emitting analog meter 1, will not be observed directly through the prism 2 by way of the second face 2b.

Since the light emitting analog meter 1 is not observed at all through the prism 2 due to total reflection by the prism 2 in this manner, the prism 2 and the light emitting analog meter 1 can be disposed at a possible smallest distance, and the distance between the prism 2 and the spherical mirror 3 can be increased to increase the distance of remote indication as much.

Further, while a third face 2c of the prism 2 is visually observed by way of the second and first faces 2b and 2a in the prism 2 when the second face 2b of the prism 2 is viewed in the direction of the ray of light 1 as described above, actually it can merely look dark because a black paint layer 2d is formed on the third face 2c of the prism 2 in the present embodiment, and a display image of the light emitting analog meter 1 is remotely indicated with respect to such dark background. Consequently, such display image is high in contrast with respect to the background.

In addition, since light which is introduced into the prism 2 by way of the second face 2b is not irradiated upon the light emitting analog meter 1 by way of the first face 2a of the prism 2 as described hereinabove with regard to total deflection of the ray of light 1 in the prism 2 of FIG. 3, washout which may otherwise arise from incidence of external light can be prevented.

Figure 4:
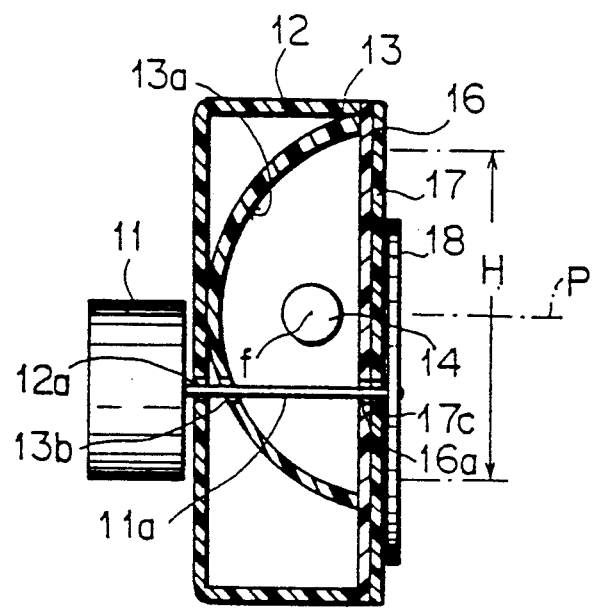
FIG. 4 is a partial sectional view of an analog meter of the light emitting type of the display device of FIG. 1.
Figure 5:
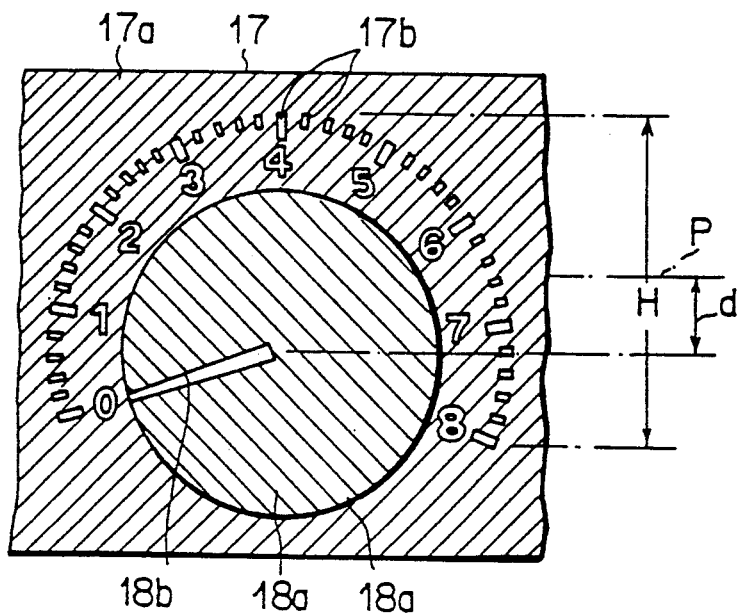
FIG. 5 is a partial front elevational view of the analog meter of FIG. 4.
Figure 6:
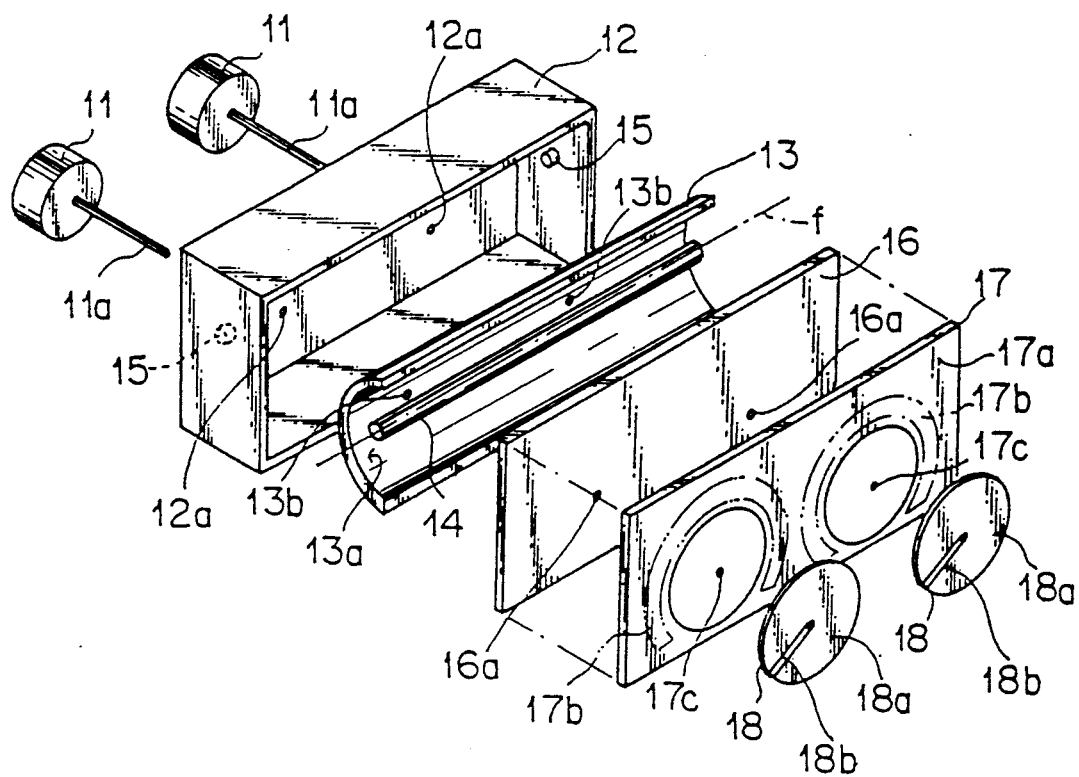
FIG. 6 is a fragmentary perspective view of the analog meter of FIG. 4.
Figure 9:
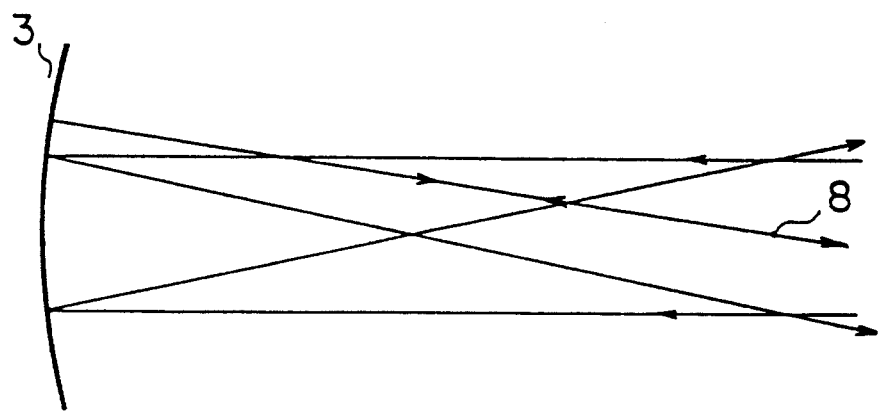
FIG. 9 is a diagrammatic view illustrating a relationship between a spherical mirror and a visual point in the display device of FIG. 1.

Referring now to FIGS. 4 to 6, the light emitting analog meter 1 of the display device is shown more in detail. The light emitting analog meter 1 shown includes a pair of meter mechanisms 11 each provided for rotating a pointer shaft 11a in response to an electric signal received from an electric circuit not shown. The meter mechanism 11 have an internal structure which is well known in the art as a structure of an analog meter, but are reduced in size. The light emitting analog meter 1 further includes a case body 12 disposed in front of the meter mechanisms 11 around the pointer shafts 11a and having an opening remote from the meter mechanisms 11, a reflector 13 accommodated in the case body 12 and having a cylindrical concave reflecting face 13a which is directed toward the opening of the case body 12, and a cold cathode ray tube or discharge lamp 14 extending along a focus f of the reflector 13. The cold cathode ray tube 14 is connected to an external power source (not shown) by way of a socket 15 and lead wires (not shown) led out from the case body 12 and thus constitutes a light source of a high output power. It is to be noted that, since the reflector 13 forms a concave mirror with the cylindrical concave reflecting face 13a thereof, the focus f extends along a straight line as seen in FIG. 6.

The light emitting analog meter 1 further includes a light diffusing plate 16 disposed in such a manner as to cover over the opening of the case body 12. A pair of dials 17 are disposed on a front face of the light diffusing plate 16, dial indicator in the form of a pointer plate 18 in the form of a disk is disposed on a front face of each of the dials 17 and is secured at the center thereof to an end of a corresponding one of the pointer shafts 11a.

A black face layer 17a is formed on each of the dials 17 by printing in black on a transparent resin plate as indicated by a hatched portion in FIG. 5 such that portions 17b thereof for graduations and numerals as well as a circular portion thereof which overlaps with the pointer plate 18 are void so that light may be transmitted through the portions 17b and the circular portion of the black face layer 17a. Another black face layer 18a is formed on the pointer plate 18 by printing in black on a disk-shaped transparent resin plate as indicated by a hatched portion in FIG. 5 such that a belt-like portion extending radially outwardly from a location at or near the center of the disk thereof is left without being printed, thereby to form a light transmitting slit 18b which serves as a pointer.

It is to be noted such portions 17b for graduations and numerals and such slit 18b as described above may be formed by stamping an opaque disk-shaped resin plate or the like which does not transmit light therethrough.

By the way, most of conventional analog meters of the car-carried type are constituted such that graduations are not formed on an entire circumference but are formed substantially over a range from 8 o'clock to 4 o'clock of the dial of a clock in the clockwise direction. Also the graduations of each of the dials 17 in the present embodiment are not formed over an entire circumference and the center of the pointer plate 18 is set to a position displaced downwardly by a fixed distance d from the center of a height H of the graduated portion of the dial 17 as shown in FIG. 5. Meanwhile, as shown in FIG. 4, the height of the reflecting face 13a of the reflector 13 is set in such a manner as to include the height H of the graduated portions of the dials 17. Then, shaft holes 17c, 16a, 13b and 12a of a small diameter are formed in the dials 17, light diffusing plate 16, reflector 13 and case body 12, respectively, corresponding to the center of the pointer plate 18. The pointer shafts 11a thus extend through the shaft holes 12a, 13b, 16a and 17c and below the cold cathode ray tube 14 toward the centers of the corresponding pointer plates 18.

With the light emitting analog meter 1 having such construction as described above, light from the cold cathode ray tube 14 is diffused by the light diffusing plate 16, and light directed toward the reflector 13 is once reflected into substantially parallel light by the reflecting face 13a of the reflector 13 and then diffused by the light diffusing plate 16. Consequently, uniform bright light is irradiated upon rear faces of the dials 17 and pointer plates 18 by way of the light diffusing plate 16 so that it looks such that only the graduations, numerals and slit 18b emit light. Thus, if one of the pointer plates 18 is rotated by the corresponding meter mechanism 11, the light emitting pointer, that is, slit 18b, is turned to point one of the light emitting graduations, thereby effecting analog indication.

Since uniform light of a high brightness is irradiated upon the rear faces of the dials 17 and the pointer plates 18 in this manner, the light emitting analog meter 1 in the embodiment described above is uniform in amount of light over a display pattern of the graduations, characters, pointers and so forth and is high in brightness. Accordingly, the light emitting analog meter 1 is suitable for use with a display device of the reflection type according to the present invention.

While a small clearance is provided between each of the dials 17 and the corresponding pointer plate 18 of the light emitting analog meter 1 described above, light may leak through such clearance. However, where the light emitting analog meter 1 is incorporated in a display device of the reflection type as described hereinabove, such leak light will little be observed because the light emitting analog meter 1 is optically viewed from the front and besides the contrast is high because a reflecting face is utilized.

However, such an arrangement as, for example, shown in FIG. 7 may be employed in order to further reduce such leak light.

Referring to FIG. 7, there is shown a modification to the light emitting analog meter 1 shown in FIGS. 4 to 6. The light emitting analog meter of FIG. 7 is modified in construction of a dial and a pointer plate from those of the light emitting analog meter 1 shown in FIGS. 4 to 6 such that each of a pair of dials 17' is disposed at a front position while a pair of pointer plates 18' are disposed between the dials 17' and the light diffusing plate 16. It is to be noted that like reference characters in FIG. 7 denote like elements or parts to those in FIG. 6.

An opening 17c' is formed at a portion of each of the dials 17' opposing to the corresponding pointer plate 18', and a black face layer 17a' in which portions 17b' for graduations and numerals are void is formed at a portion of each of the dials 17' around the opening 17c' in a similar manner as seen in FIG. 5. Meanwhile, a slit 18b' is formed on the black face 18a' on each of the pointer plates 18' similarly to the pointer plate 18.

A stepped portion 17d' is formed along the periphery of the opening 17c' of each of the dials 17' adjacent the pointer plate 18', that is, adjacent the light diffusing plate 16, in such a manner as to provide a radially inwardly extending flange as seen from a sectional view of FIG. 8, and the pointer plate 18' is fitted in the opening 17c' such that a peripheral portion of the pointer plate 18' is opposed to the flange of the dial 17' with some clearance left therebetween. Leakage of light through a clearance between the dials 17' and the pointer plates 18' is thus decreased by the stepped portions 17d' of the dials 17'.

While the spherical mirror 3 in the display device of the reflection type in the embodiment and in the modified display device described above is provided to achieve enlarged display and prevention of dazzling by external light, it extends longitudinally in such a direction perpendicular to the plane of FIG. 1. Accordingly, where the spherical mirror 3 is used, possible deformation of an image to be formed by the spherical mirror 3 can be reduced if the display face of the light emitting analog meter 1, that is, each of the dials 17, is formed not as a flat face but as a curved face as shown in FIGS. 11a and 11b or as a face having a plurality of contiguous flat portions as shown in FIGS. 12a and 12b.

Figure 11A:
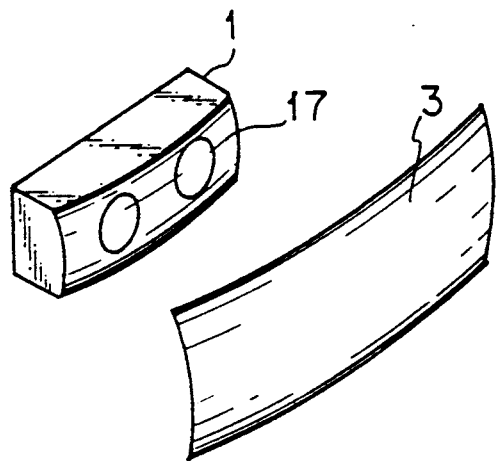
FIGS. 11a and 11b are a perspective view and a schematic plan view showing a modified dial.
Figure 11B:
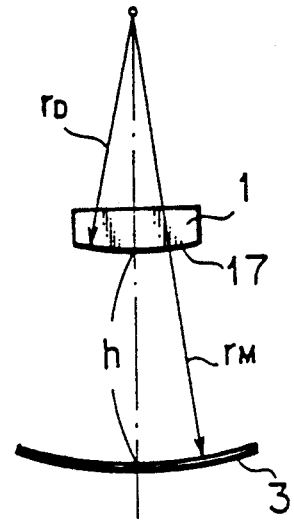

Referring to FIG. 11a, the dial 17 is formed such that it has a convex curved face having a curvature conforming to a curvature of the spherical mirror 3. The radius $r_D$ of curvature of the convex face of the dial 17 is set to a value given by $$r_D = r_M - h$$

where $r_M$ is a radius of curvature of the spherical mirror 3, and h is a distance from the convex face of the dial 17 to the spherical mirror 3 as seen in FIG. 11b. It is to be noted that, while an aberration by the spherical mirror 3 cannot be corrected completely by the condition, a sufficient effect of correction can be achieved for practical use.

Figure 12A:
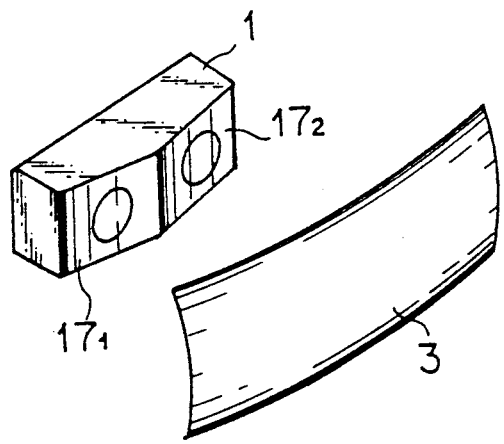
FIGS. 12a and 12b are views similar to FIGS. 11a and 11b, respectively, but showing another modified dial.
Figure 12B:
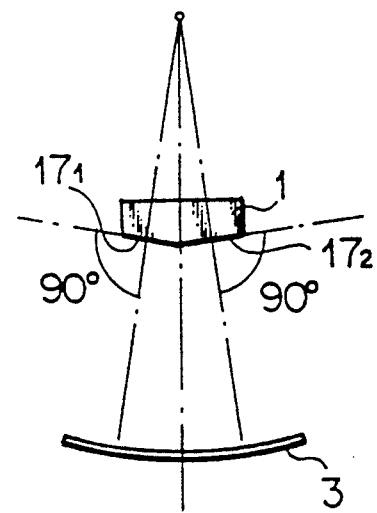
Figure 13:
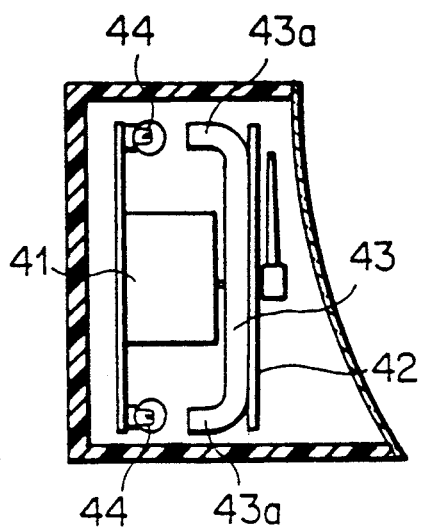
FIG. 13 is a schematic side elevational view showing a conventional analog meter of the light emitting type.
Figure 14:
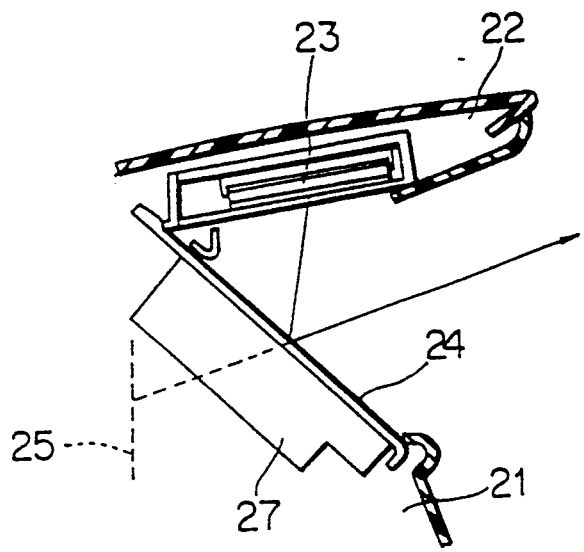
FIG. 14 is a schematic sectional view showing a conventional display device which employs a reflecting mirror.
Figure 15:
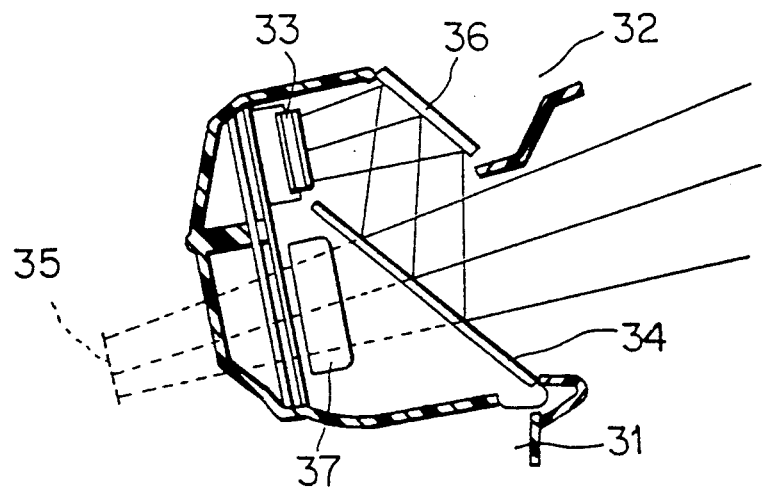
FIG. 15 is a similar view but showing another conventional display device which employs a reflecting mirror.

Referring now to FIG. 12a, the dial 17 is formed such that it has a plurality of flat faces formed thereon which are arranged so as to have a radius of curvature approximately conforming to that of the spherical mirror 3. More particularly, referring to FIG. 12b, the dial 17 has a pair of faces $17_1$ and $17_2$ which extend perpendicularly to normal lines thereto from the center of the sphere of the spherical mirror 3. Graduations for different meters (for example, a speedometer and a tachometer) are formed on the flat faces $17_1$ and $17_2$ of the dial 17.

Where the dial 17 has a plurality of faces in this manner, the effect of correction of an aberration by the spherical mirror 3 is lower than that of the dial 17 of FIG. 11. However, the dial 17 of FIG. 12a can be used practically without any trouble, and formation of the dial 17 can be performed readily.

It is to be noted that, since the dial 17 of the light emitting analog meter 1 and the spherical mirror 3 are opposed in parallel to each other, little deformation of in image appears which may otherwise be caused by an aberration at upper and lower positions of each graduation of the dial 17, and accordingly, the quality of display is not deteriorated for practical use.

Having now fully described the invention, it will be apparent to one of ordinary skill in the art that many changes and modifications can be made thereto without departing from the spirit and scope of the invention as set forth herein.

What is claimed is:

1. A display device for a vehicle which includes a light emitting analog meter and means provided on an instrument panel of said vehicle for reflecting display light from said light emitting analog meter toward a driver's seat of said vehicle wherein said light emitting analog meter comprises:

a light source, a reflector having a concave reflecting face, an optical diffusing plate, said light source comprising a discharge lamp located at a focus of said reflector between said reflector and said diffusing plate, a light transmitting dial indicator and a dial having light transmitting graduations located on a side of said diffusing plate opposite from said reflector for emitting a display light through said dial indicator and said graduations when said dial indicator and said graduations are illuminated by light from said discharge lamp transmitted through said diffusing plate, a meter mechanism disposed on a side of said reflector opposite from said diffusing plate, said meter mechanism having a rotatable shaft which extends through said reflector and said diffusing plate, and means connecting said rotatable shaft to said dial indicator.

2. A display device for a vehicle as claimed in claim 1, wherein said light transmitting dial indicator is a pointer plate in the from of a disk having a light intercepting face and a light transmitting slit formed on said light intercepting face and extending from a central portion of the disk to an outer periphery of the disk, said dial has a light intercepting face, said light transmitting graduations are formed in a circumferential row on said light intercepting face of said dial, a light transmitting circular portion formed on the inner side of said light transmitting graduations and having a circular shape coincident with the shape of said disk, said pointer plate being disposed in an aligned relationship in front of said light transmitting circular portion of said dial, and said rotatable shaft is connected to the center of said pointer plate.

3. A display device for a vehicle as claimed in claim 1, wherein said light transmitting dial indicator is a pointer plate in the form of a disk having a light intercepting face and a light transmitting slit formed on said light intercepting face and extending from a central portion of the disk to an outer periphery of the disk, said dial has a light intercepting face, said light transmitting graduations are formed in a circumferential row on said light intercepting face, a light transmitting opening formed on the inner side of said light transmitting graduations, said light transmitting opening having a diameter smaller than the diameter of said pointer plate, said pointer plate being disposed such that a peripheral portion thereof is overlapped with a peripheral portion of said dial around said light transmitting opening, and said rotatable shaft is connected to the center of said pointer plate.

4. A display device for a vehicle which includes a light emitting analog meter having a light transmitting dial indicator and a dial having light transmitting graduations, a reflecting member having a reflecting face directed toward said dial indicator and said dial, and a light transmitting and reflecting element disposed between said light emitting analog member and said reflecting member, said light transmitting and reflecting element having a first face and a second reflecting face through which light emitted from said light emitting analog meter and incident on said first face is transmitted, wherein said light emitting analog meter comprises:

a light source, a reflector having concave reflecting face, an optical diffusing plate, said light source comprising a discharge lamp located at a focus of said reflector between said reflector and said diffusing plate, a meter mechanism disposed on a side of said reflector opposite from said diffusing plate, said meter mechanism having a rotatable shaft which extends through said reflector and said diffusing plate and is connected to said dial indicator, whereby light from said discharge lamp is reflected by said reflector and transmitted through said optical diffusing plate to irradiate rear faces of said dial and said dial indicator, and said reflecting member being disposed such that an optical axis of display light transmitted through said dial indicator and said light transmitting graduations which is transmitted though the light transmitting and reflecting element and introduced to said reflecting face of said reflecting member is one of coaxial and paraxial with the optical axis of said display light after said display light is reflected by said reflecting face of said reflecting member and said reflected display light from said reflecting face of said reflecting member is directed to a driver's seat side of said vehicle by the second reflecting face of said light transmitting and reflecting element.

5. A display device for a vehicle as claimed in claim 4, wherein said light transmitting and reflecting element is a prism, said first face and said second reflecting face intersect each other at an angle, said first face of said prism being opposed to said dial indicator and said dial of said light emitting analog meter, said angle between said first face and said second reflecting face of said prism being set such that light other than display light introduced to said second reflecting face in a direction opposite to the direction in which said reflective display light from said reflecting face of said reflecting member is reflected by said second reflecting face is totally reflected by said first face in said prism.

6. A display device for a vehicle as claimed in claim 5, wherein said prism has a further face which is processed in a dark color.

7. A display device for a vehicle as claimed in claim 4, wherein said reflecting face of said reflecting member is a spherical concave face, and said reflecting member is disposed such that the center of the spherical concave face of said reflecting face thereof optically coincides or substantially coincides with a preset position as a visual point position on the driver's seat side of said vehicle.

8. A display device for a vehicle as claimed in claim 4, wherein said light transmitting dial indicator is a pointer plate in the form of a disk having a light intercepting face and a light transmitting slit formed on said light intercepting face and extending from a central portion of the disk to an outer periphery of the disk, said dial has a light intercepting face, said light transmitting graduations are formed in a circumferential row on said light intercepting face of said dial, a light transmitting circular portion formed on the inner side of said light transmitting graduations and having a circular shape coincident with the shape of said disk, said pointer plate being disposed in an aligned relationship in front of said light transmitting circular portion of said dial, and said rotatable shaft is connected to the center of said pointer plate.

9. A display device for a vehicle as claimed in claim 4, wherein said light transmitting dial indicator is a pointer plate in the form of a disk having a light intercepting face and a light transmitting slit formed on said light intercepting face and extending from a central portion of the disk to an outer periphery of the disk, said dial has a light intercepting face, said light transmitting graduations are formed in a circumferential row on said light intercepting face, a light transmitting opening formed in a portion of said dial on the inner side of said light transmitting graduations, said light transmitting opening having a diameter smaller than the diameter of said pointer plate, said pointer plate being disposed such that a peripheral portion thereof is overlapped with a peripheral portion of said dial around said light transmitting opening, and said rotatable shaft is connected to the center of said pointer plate.

* * * * *